United States Patent [19]
Scholler

[11] 3,947,703
[45] Mar. 30, 1976

[54] REGULATED SUPPLY UNITS
[75] Inventor: Jean-Pierre Scholler, Maisons Laffitte, France
[73] Assignee: Compagnie Internationale Pour L'Informatique, Louveciennes, France
[22] Filed: Oct. 11, 1974
[21] Appl. No.: 514,227

[52] U.S. Cl. ............... 307/297; 307/254; 307/260
[51] Int. Cl.² ...................................... H03K 17/00
[58] Field of Search ........... 307/254, 255, 260, 232, 307/297; 323/75 E

[56] References Cited
UNITED STATES PATENTS
3,260,912   7/1966   Gregory ............................. 307/254
3,283,238   11/1966  Huge et al. ........................ 323/75 E Primary Examiner—Stanley D. Miller, Jr.
Assistant Examiner—B. P. Davis
Attorney, Agent, or Firm—Kemon, Palmer & Estabrook

[57] ABSTRACT

In a regulated supply unit comprising a transistor bridge across one diagonal of which is connected the D.C. voltage source and from the other diagonal of which is outputted the regulated voltage through an output transformer, each pair of diagonally opposite branches of the bridge being controlled by a corresponding pair of transistor condition switching circuits, the regulation signal is only applied to two of the said control circuits which control two branches of the bridge connected to a same pole of the D.C. voltage source. Further, as each control circuit comprises a transformer across the secondary winding of which is connected the collector-emitter space of a transistor and to an intermediate tap of which is connected the base of said transistor, a series resistance connects the emitter to the corresponding pole of the said winding and to the corresponding pole of the diagonal of the bridge.

11 Claims, 4 Drawing Figures

REGULATED SUPPLY UNITS

SHORT SUMMARY OF THE INVENTION

The present invention concerns improvements in or relating to regulated supply units which are specially adapted to be used in information processing systems as they are of relatively small volume, reasonably low cost and of a high degree of viability.

The invention is more definitely concerned with that kind of regulated supply units which operates on the principle of high frequency switching of alternate paths from the D.C. source to the output. The frequency of the switching may be of several kilohertz, 20 k.Hz for instance, so that the volume of the coils of the transformers and filters, which constitute about 60 to 80% of the total volume, is drastically reduced with respect to that of the regulated supply units which operate at low frequency rates. Further, the efficiency, i.e. the energetic one, of such high frequency operated supplies is high.

A particular structure of the concerned kind is, for instance, described in an article by P.F. PITTMAN, R. J. RAVAS & R. W. BRIGGS, entitled "Staggered Phase Technique Shrinks Power Conditioners" in "ELECTROTECHNOLOGY", vol. 83, June 1968, No. 6, pages 55–58. The structure comprises a bridge of four transistors across a diagonal of which is connected the voltage source to regulate and across the other diagonal of which is outputted the regulated voltage. The transistors of the pairs of diagonally opposite branches of the bridge are alternately blocked and saturated with a "dead" time interval between the half-periods of the control and the regulation is ensured by a signal which controls the length of said dead time interval.

When however, and in contradistinction with the structure described in the above referred publication, the regulated voltage outputting arrangement comprises a transformer, the operation is no more actually secure for the following reason;

The transformer may begin to auto-oscillate during the dead levels of the voltage during the said dead time intervals of the control. The regulation is consequently destroyed;

When the stockage times of the transistors are too lengthy, simultaneous conduction and consequent destruction of the transistors of the samely supplied branches of the bridge may occur;

With this kind of control by blocking and unblocking in simultaneous condition of the transistors of the opposite pairs of branches of the bridge, a variation of the magnetic component of the current may appear due to a difference between the times of conduction and between the collector-emitter voltages of the transistors from one half-period to the other half-period of the switching control. Such a variation leads to an unbalance of the currents which pass through the halves of the branches of the bridge and said unbalance creates a permanent D.C. current through the output transformer. When such a D.C. component comes to a too high value, the transformer saturates and the transistors risk destruction.

The present invention aims to provide a regulated supply unit of the herein above defined kind having means for avoiding such risks and drawbacks.

DETAILED DESCRIPTION

Figure 1:
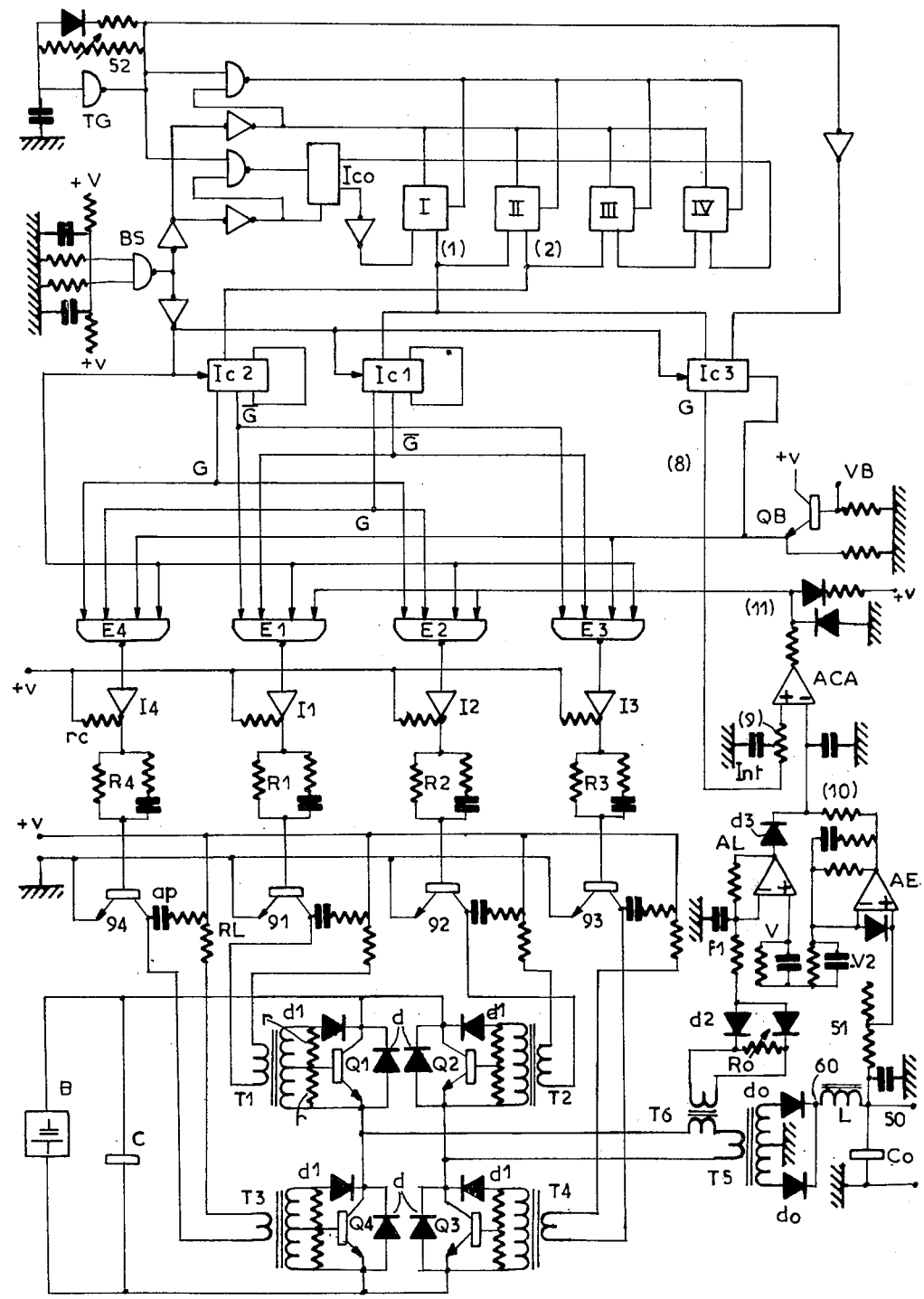
FIG. 1 shows an example of embodiment of a regulated supply unit according to the invention.

Referring to FIG. 1, the high frequency switching controlled bridge comprises four power transistors, Q1 to Q4. The collectors of the transistors Q1 and Q2 are connected to one pole, the positive one for instance, fo a D.C. voltage source such as a battery B of 48 volts for instance. The emitters of the transistors Q3 and Q4 are connected to the other pole of the source. Across the battery B is shunt connected a condenser C which stores the energy from the source in order to maintain a substantially constant potential difference across the poles of the thus defined diagonal of the bridge. Across the other diagonal of the bridge is connected the primary winding of an output transformer T5. The secondary winding of T5 presents a grounded mid-tap and its ends are, through Schottky diodes $do$, connected to the input of a ripple eliminating filter comprised of a series inductance coil L and a shunt grounded capacity Co. The regulated voltage appears at 50 across Co.

Each power transistor circuit comprises the secondary winding of a transformer, T1 to T4 for the transistors Q1 to Q4. The transistor is connected by its collector and its emitter across the secondary winding. The connection to the collector includes a series diode $d1$. The base of the transistor is connected to an intermediate tap of the secondary winding. Damping resistors $r$ are shunt connected across the two parts of the windings defined by said tap. With such a circuit arrangement, each transistor works outside its saturation zone. A quick switching diode $d$ is connected across the emitter and the collector of each transistor in order to avoid that the magnetizing energy of the output transformer 5 can close through the transistor and produce a reverse biassing thereof; and said diode $d$ reduces the over-voltages across the collector and the emitter of the transistor.

The voltage outputting the filter 60 is compared in a voltage divider 51 to a reference voltage V2, which must be understood as being of a negative D.C. value. The resulting error signal is applied on an input of an analog comparator ACA through an operational amplifier AE. The output (10) of AE is a D.C. voltage the level of which depends from the departure of the regulated voltage and the reference voltage.

As a protection of the supply against overloads and short-circuits, it is additionally provided to limit the value of the error voltage by means of the following circuitry: a current transformer T6 is connected with its primary winding in series with the primary winding of the output transformer T5 and the potential difference across an adjustable resistor Ro across the secondary winding of the transformer T6 is rectified at $d2$ and filtered at $f1$. The rectified voltage is compared by a comparator AL to a reference voltage V. The output of AL is brought to point (10) through a diode $d3$. As long as $d3$ remains blocked, the arrangement does not operate but as soon as $d3$ unblocks, the voltage at point (10)

decreases, consequently acting in the reverse direction of the regulation and introducing a limitation thereof.

Figure 2:
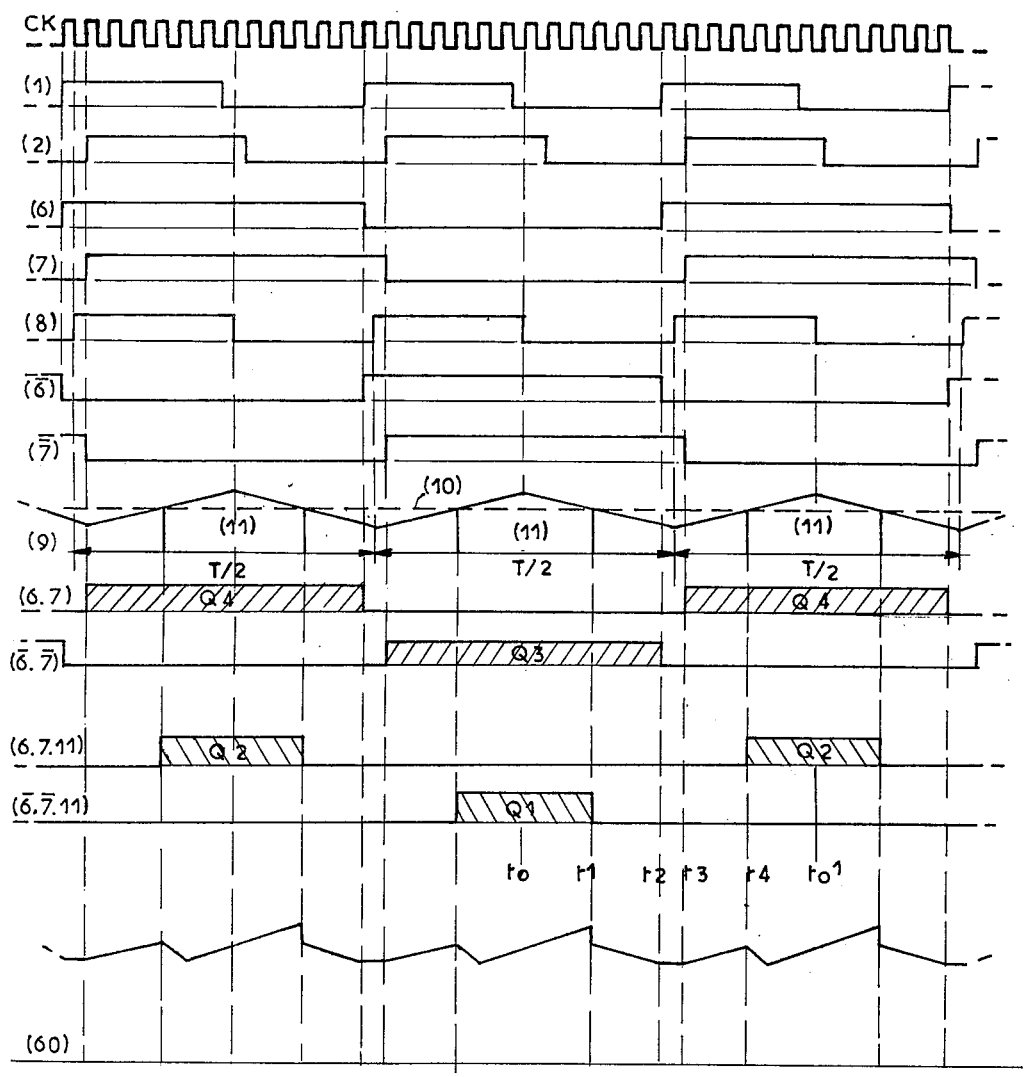
FIG. 2 shows diagrams of signals and waveforms concerned in said embodiment.

A clock pulse generator TG, issuing the waveform shown on the curve CK of FIG. 2, comprises a trigger circuit the frequency of which is adjusted by a resistance 52 to a value of, for instance, 400 K.Hz. The pulse frequency is divided by five by a Johnson pulse counter comprising, for instance, the five stages I to IV and Ico. Only the waveforms (1) and (2) from the stages I and II are shown in FIG. 2 as only said waveforms are used for the derivation of the signals which control the switching of the transistors Q1 to Q4 of the bridge. Said waveforms (1) and (2) are applied to circuits Ic1 and Ic2 which divide by two their frequency. Each one of the divider circuits Ic1 and Ic2 presents complementary outputs G and $\overline{G}$, the corresponding waveforms are shown at (6) and ($\overline{6}$) for the output of Ic1 and at (7) and ($\overline{7}$) for the output of Ic2.

The signal (1) is further shifted by one-half of the period of the clock by a circuit Ic3 which receives both said signal and the clock signal CK. The shifted waveform is shown at (8) in FIG. 2 and applied to an integrator circuit Int such as a condenser-resistance network. The saw-tooth waveform thus formed at (9) is applied to the other input of the analog comparator ACA. The phase of said saw-tooth waveform, of T/2 period with respect to the switching control of the bridge is used as a reference phase for this control.

At the output (11) of the analog comparator ACA, a pseudo-rectangular signal is available, repeated each T/2 period and of a length proportional to the difference between the output voltage of the unit and the reference voltage illustrated by the level (10) in FIG. 2. Said pseudo-rectangular signals are shown at (11) in the graph (9).

The primary windings of the transformers T1 to T4 are serially connected with transistors 91 to 94 through current-limiting resistors RL. A deparasiting network ap is connected in shunt across this series circuit supplied by a voltage +v at the level of the collector of its transistor. The emitters of 91 to 94 are grounded. The bases of the transistors are fed by +v through load resistors rc and switching operation speeding networks R1 to R4. The switching control of the condition of each of the transistors 91 to 94 passes through an inverter circuit, I1 to I4, from the respective outputs of gates E1 to E4 of the NAND type.

The gates E1 and E3 receive the $\overline{G}$ signals from the circuits Ic1 and Ic2. The gates E2 and E4 receive the G signals from said circuits. The gates E1 and E2 additionally receive the analog error signal (11). Such combinations of signals result, at the level of the power transistors Q1 to Q4, in conduction periods as shown in the graphs (6.7), ($\overline{6.7}$), (6.7.11) and ($\overline{6.7.11}$) of FIG. 2, on which further the controlled transistors are marked. It may be seen that the transistors Q1 and Q3, on the first part, and the transistors Q2 and Q4, on the second part, are controlled in-phase, whereas the said pairs of transistors are relatively controlled in opposition of phases. The times of conduction of the transistors Q3 and Q4 are constant whereas the times of conduction of the transistors Q1 and Q2 are variable according to the level of the error signal (10).

The graph 60 of FIG. 2 shows the waveform of the signal outputting at 60 from the regulated unit, the operation of which may be explained as follows:

Starting for instance from a time instant to where Q1 and Q3 are conducting, the voltage $V_c$ of the source B is applied to the primary winding of the transformer T5, minus the voltage drop of the collector-emitter space of the transistors. The upper diode of the pair is conducting.

At the time instant $t1$, Q1 blocks. The primary current closes through Q3 and the diode $d$ of the current of Q4. Its decrease induces an electromotive force which generates a small current in the lower diode of the pair do.

At the time instant $t2$, Q3 blocks. The primary current passes through the diodes $d$ of the circuits of the transistors Q1 and Q2 and thereafter becomes zero. The magnetizing component of the said current closes at the secondary winding of T5 through the lower diode do and the resistive component equally divides between the two diodes do.

The time inverval $t2-t3$ is the guard interval, equal to one period of the clock, of a value equal to 2.5 microseconds, so that the transistor Q3 is totally blocked before the transistor Q4 begins to conduct. The stocking time plus the descending time of Q3 cannot outpass one half of a microsecond for a fixed time interval of conduction for Q3 and Q4 equal to 22.5 microseconds.

At the time instant $t3$, the transistor Q4 becomes conducting for such a constant value. The primary current of T5 closes through Q4 and the diode $d$ of the circuit of Q3. Its increase generates an electromotive force which produces a small current through the upper diode of the pair do.

At the time instant $t4$, the transistor Q2 becomes conducting. The full voltage $V_C$ is applied to the primary winding of the transformer T5, minus the collector-emitter voltage drop of the transistors. The lower diode of the pair do is conducting.

At the time instant $to^1$, all conditions existing at the time instant to are restored and the next cycle is the symmetric image of the cycle which has been described; and so forth.

At the start of operation of the unit, and as long as the auxiliary supplies such as +v and −v are not yet stabilized, a Schmitt trigger BS issues a signal which, inverted, blocks the gates E1 to E4 and resets to zero the Johnson counter and the two-condition circuits Ici, Ic2 and Ic3.

When required, the regulation can be blocked from the application of a blocking signal VB to the base of a transistor QB which, when saturated, directly blocks the gates E3 and E4 and, through Ic3 and ACA, the gates E1 and E2.

Once the transformers T1 to T4 duly equilibrated, the unbalance is mainly due in the bridge to the dispersion on the values of the transistor parameters: switching response time intervals and, mainly, stockage time and potential across collector and emitter thereof. The provision of a secondary winding of the control transformer, T1 to T4, in each power transistor circuit, acts as an antisaturation means for a substantial reduction of the stocking times of the transistors and a substantial reduction of the unbalance at the level of the output transformer. Such an arrangement however does not eliminate the imperative sorting of the power transistors. Such a sorting is all the more drastic that the power of the supply unit must be high. An increase of this power may be provided, as known, by paralleling several power transistors across the secondary windings of the control transformers T1 to T4.

Figure 3:
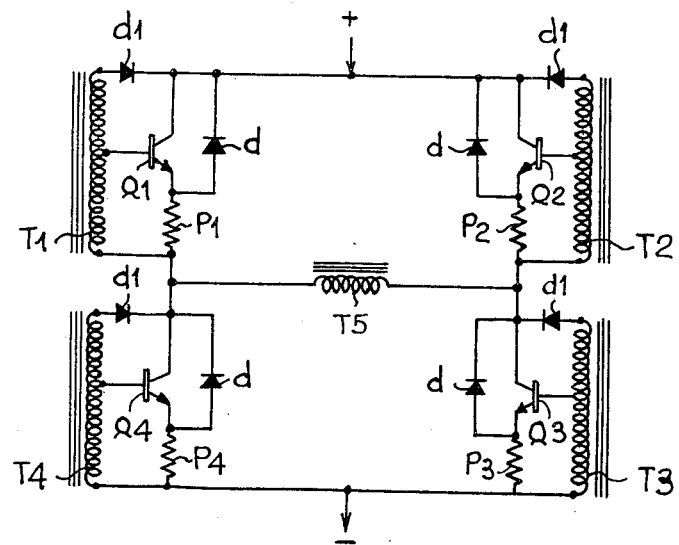
FIG. 3 shows a partial modification of the embodiment of FIG. 1, and, FIG. 4 shows a further modification of said embodiment.
Figure 4:
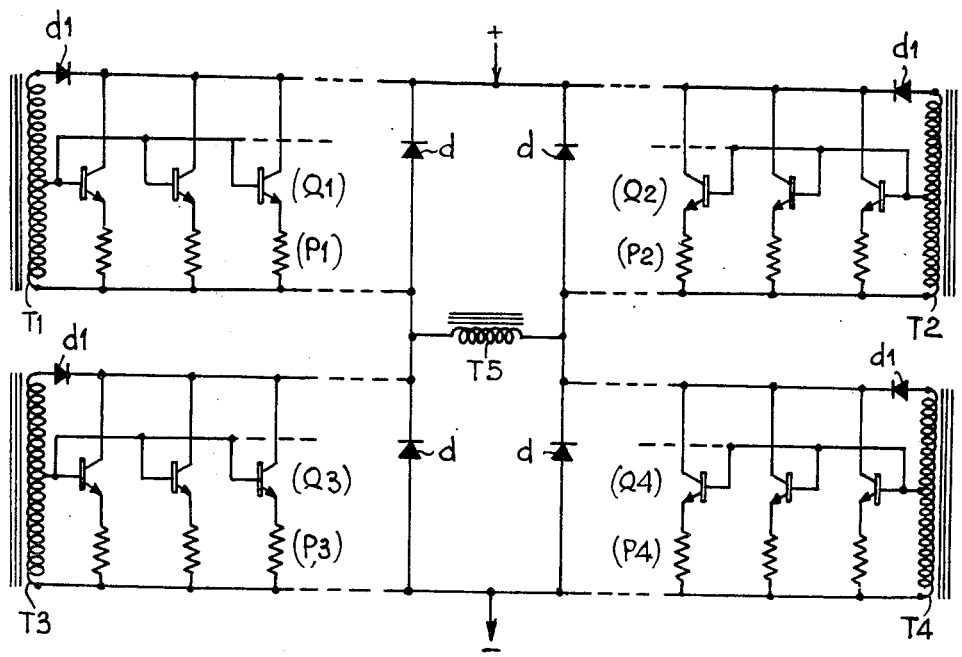

In FIG. 3, a modification is shown which enables a better balance of the bridge of power transistors. A resistance, P1 to P4, is inserted in each power transistor circuit between the emitter of the transistor and the pole of the diagonal to which said emitter is connected, which is also the point of connection of one end of the secondary winding of the control transformer. The resistance r of the transistor circuits of FIG. 1 may or not be preserved as the case may be. FIG. 4 shows that, in an arrangement wherein several power transistors are connected in parallel across the secondary winding of the input control transformer, such a resistor is provided between each emitter and such a pole.

With such a modification, if the electrical current tends to unbalance from one branch to the other one of the bridge, if, for instance, the current has a tendency to increase on the side Q1–Q3, the voltage drop across P1 and P3 would increase and this increase would be amplified by the corresponding control transformer, (with the own ratio of transfer of said transformer). The collector voltage of Q1 and Q3 would then increase in the same proportion. This would result in a decrease of the voltage applied to the output transformer T5 during the conduction period of Q1 and Q3. The converse effect would exist for the other pair of transistor circuits, Q2 and Q4, of the bridge. Such a decrease of voltage would also decrease the regulated current, thereby reinforcing the regulation action of the unit.

The conjugated use of the antisaturation pulse transformers and of the emitter resistors highly minimize the unbalance of electrical current in the bridge from automatic compensation therefrom of the dispersions in the collector-emitter voltages of the transistors and the dispersions of the stockage times thereof. Actually a circuitry such as shown in FIG. 3 acts as au auxiliary regulation loop, internal to the bridge, the action of which concurs to the regulation obtained from the external regulation loop.

What is claimed is:

1. A regulated power supply system comprising in combination:
   a. a four legged bridge, each leg of which includes at least one high frequency switched power transistor;
   b. a source of DC voltage connected across one diagonal of said bridge;
   c. a regulated output transformer connected across the other diagonal of said bridge;
   d. clock controlled time base means;
   e. first and second pairs of switching circuits for said power transistors connected to control respectively, pairs of said transistors in diagonally opposite legs of said bridge;
   f. first and second circuits connected to said time base means for deriving therefrom first and second wave forms in relative phase opposition and connect said wave forms to the control inputs of said first and second pairs of switching circuits;
   g. each of said switching circuits including a transformer having a center tapped secondary winding connected across the collector emitter of at least one said power transistor and the tap connected to the base of the same transistor;
   h. a reference wave form generator;
   i. an error signal forming circuit connected to compare the secondary voltage of said output transformer with a reference voltage;
   j. a regulation signal forming circuit connected to receive said error signal and the output of said reference waveform generator and compare said signal; and
   k. means applying the output of said regulating signal forming circuit to one only of the transistor switching control circuits of said first pair and to one of the transistor switching circuits of said second pair, one of said switching circuits connected respectively to control two legs of said bridge connected to the same side of said DC voltage source.

2. A regulated power supply system as defined by claim 1 in which said first and second circuits for deriving first and second waveforms in relative phase opposition comprise AND gate circuits operating on two identical frequency waveforms which are relatively shifted by one period of the clock of said time base means and are supplied by said time base means.

3. A regulated power supply system as defined by claim 2 in which said reference waveform generator has its input connected to one of said identical frequency waveforms.

4. A regulated power supply system as defined by claim 1 including a current overflow detector associated with the primary winding of said regulated voltage output transformer and an error signal limiting circuit connected to subtract the voltage output of said detector from the output of said error signal forming circuit.

5. A regulated power supply system as defined by claim 1 including a plurality of resistors, one connected between the emitter of each power transistor and one end of the secondary winding of said control circuit transformer.

6. A regulated power supply system as defined by claim 5 including a plurality of quick switching diodes, one connected respectively across the collector-emitter of each said transistor.

7. A regulated power supply system as defined by claim 5 including a plurality of quick switching diodes, one connected across the collector and that end of said resistor remote from said emitter.

8. A regulated power supply system as defined by claim 5 including a plurality of power transistors connected in parallel across the secondary winding of a control transformer in each leg of said bridge, a plurality of resistors, one connected between the emitter and diagonal pole of said bridge for each transistor.

9. A regulated power supply system as defined by claim 1 including a circuit connected to detect instability of the voltage supply for said switching circuit, and means controlled by said circuit for blocking the activation of said waveform forming circuits and said switching control circuits during each period of detection of voltage instability.

10. A regulated power supply system as defined by claim 1 including a regulation blocking circuit connected to de-activate said transistor switching control circuits and said reference waveform generator in each of its active periods.

11. A regulated power supply system comprising in combination:
   a. a four leg bridge, the legs being high frequency switched power transistors;
   b. a source of DC voltage connected across a diagonal of said bridge;
   c. an output transformer connected across the other diagonal of said bridge;
   d. means deriving a voltage departure error signal from said output transformer;

e. means establishing a first pair of oppositely phased waveforms controlled by said error signal;
f. means establishing a second pair of oppositely phased waveforms independent of said error signal;
g. means controlling two of the legs of said bridge connected to one pole of said source of DC voltage by the waveforms of said first establishing means; and
h. means controlling the other two legs of the bridge from said second oppositely phased waveforms, said first and second waveforms being respectively connected in opposite phase relation between diagonally opposite legs of said bridge.

* * * * *